(12) United States Patent
Ancel

(10) Patent No.: US 6,220,677 B1
(45) Date of Patent: Apr. 24, 2001

(54) JOINERY MOLDING AND METHOD OF JOINING

(76) Inventor: Douglas R. Ancel, 3849 E. Worth Rd., Pinconning, MI (US) 48650

(*) Notice: Subject to any disclaimer, the term of this patent is extended or adjusted under 35 U.S.C. 154(b) by 0 days.

(21) Appl. No.: 09/196,254

(22) Filed: Nov. 18, 1998

(51) Int. Cl.[7] ................................................ A47B 96/18
(52) U.S. Cl. .................................... 312/140.4; 52/35
(58) Field of Search ........................... 312/140.1, 140.4, 312/257.1, 107, 140.3, 34, 35; 52/287.1, 716.02, 717.05, 829; 108/27

(56) References Cited

U.S. PATENT DOCUMENTS

| | | | |
|---|---|---|---|
| 2,038,638 | 4/1936 | Brey | 4/187 |
| 2,041,899 * | 8/1991 | Brand | 52/287.1 |
| 2,178,501 * | 10/1939 | Stancampiano et al. | 52/35 |
| 2,300,084 | 10/1942 | Wright | 20/74 |
| 2,570,850 * | 10/1951 | Pearson | 312/140.3 |
| 2,614,014 | 10/1952 | Stanitz | 311/106 |
| 2,697,019 | 12/1954 | Stefan | 311/103 |
| 2,785,937 | 3/1957 | Murray | 311/103 |
| 2,895,778 | 7/1959 | Lieber | 311/106 |
| 3,222,837 * | 12/1965 | Daley | 52/76.02 |
| 3,359,574 | 12/1967 | Stoneburner | 4/173 |
| 3,606,508 * | 9/1971 | Burnes | 312/140.3 |
| 4,347,793 | 9/1982 | Rajnert | 108/27 |
| 4,829,730 | 5/1989 | Zeilinger | 52/288 |
| 5,330,262 | 7/1994 | Peters | 312/140.4 |
| 5,452,666 | 9/1995 | Peters | 108/27 |

* cited by examiner

Primary Examiner—Peter M. Cuomo
Assistant Examiner—Jerry Anderson
(74) Attorney, Agent, or Firm—John J. Swartz

(57) ABSTRACT

An elongate back splash molding and method of installing a back splash molding including a horizontal leg, adapted to be received in an upwardly opening notch provided in a counter top, and a vertical leg, integral with the horizontal leg, adapted to be received by a downwardly opening notch provided in a back splash which is mounted on the counter top rearwardly adjacent the slot. The horizontal leg includes a curvilinear top surface and a front surface joined to the curvilinear surface at via an edge which lies flush with the upper surface of the counter top. The vertical leg includes a front curvilinear surface having a lower end which makes a smooth transition with the curvilinear top surface. The vertical leg also includes an elongate top end face which is downwardly forwardly inclined and is joined to the top front surface along an edge which is flush with the front face of the back splash and an upper end disposed flush with the front face of the back splash. The confronting surfaces of the counter top, back splash and back splash molding, which are formed of non-laminated, non-foamed, non-coated, plastic solid surfacing material, are adhesively joined to provide a water impervious, virtually imperceptible joint.

59 Claims, 3 Drawing Sheets

JOINERY MOLDING AND METHOD OF JOINING

BACKGROUND OF THE INVENTION

1. Field of the Invention

This invention relates to a joinery molding and method of joining an upstanding panel, such as a back splash to a base, such as a counter top, and more particularly, to a non-laminated, plastic, solid surface cove molding for joining two 90° related parts such as a back splash mounted on a non-laminated, plastic, solid surface counter top.

2. Description of the Prior Art and Objects

Counter tops for kitchens, bathrooms, and the like are normally installed with a back splash which extends upwardly a short distance above the counter top work surface. It has been conventional to provide a cove molding at the junction of a laminated counter top and laminated back splash such as that disclosed, for example, in U.S. Pat. No. 2,785,937, issued to H.B. Murray on Mar. 19,1997 and U.S. Pat. No. 4,829.730 issued to Allen Zeilingeron May 16, 1989.

In recent years, countertops and back splashes have frequently been manufactured with non-laminated, plastic, solid surfacing material which is preferable by consumers in many instances because of its finish, cleaning ability, high durability and aesthetics. Such plastic solid surfacing materials are sold under the trademark "CORIAN " which is owned by the E.I. DuPont de Nemours and Co., Inc., of Wilmington, Delaware. This product is described in U.S. Pat. No. 5,452,666 issued to Chris R. Peters on Sep. 26, 1995 and U.S. Pat. No. 3,847,865 issued to R. B. Duggins on Nov. 12, 1974, which are incorporated herein by reference. The product is a substantially rigid, non-foamed, non-laminated, non-coated solid material composed primarily of acrylic components.

The aforementioned U.S. Pat. No. 5,452,666 discloses a counter top and back splash, manufactured with CORIAN material, having a cove lip integral with the back splash and received in a dado provided in the upper surface of the counter top. The prior art integral back splash construction has several disadvantages including the complexity of manufacture and the susceptibility of breakage and expense. If a user wants to couple a relatively short portion of a back splash to a counter top, the prior art construction cost is relatively high because the back splashes are typically manufactured in 12 foot sections and thus a relatively expensive back splash and molding must be purchased in order to accommodate the short section required. Moreover, the integral cove lip and back splash, disclosed in U.S. Pat. No. 5,452,666, restricts the interchange of back splashes of different materials which can be utilized with the CORIAN material counter top. Accordingly, it is an object of the present invention to provide a new and novel joinery molding for joining two right angularly related parts.

It is an object of the present invention to provide a new and novel cove molding for joining a back splash and a counter top.

It is another object of the present invention to provide a new and novel joinery method of joining two right angularly related parts.

It is another object of the present invention to provide a new and novel cove molding which, prior to installation, is independent of the back splash and counter top.

It is still another object of the present invention to provide a new and novel cove molding, and method of installing a cove molding, which can couple a non-laminated plastic solid surface base to any selected one of a plurality of different upstanding panel of different materials.

It is yet another object of the present invention to provide a molding and method of installing a molding which has a horizontal leg that is received in a slot provided in an upper surface of a horizontal base, such as a counter top, to be joined to an upstanding panel, such as a back splash.

It is a further object of the present invention to provide a molding and method of installing a molding of the type described comprising a horizontal leg including a top surface having a front end which is disposed flush with the upper surface of a base, such as a counter top, to be joined to an upstanding panel, such as a back splash.

It is a still further object of the present invention to provide a back splash molding and method of installing a cove molding of the type described including a horizontal leg having a front face provided with an upper end which is disposed in the plane of the upper surface of the counter top.

It is still another object of the present invention to provide a back splash molding and method of installing a cove molding of the type described including a front face and a curvilinear top face which are joined along an upper front edge which is flush with the upper surface of the counter top.

Still another object of the present invention is to provide a molding of the type described including a vertical leg having an elongate upper end surface which is downwardly forwardly inclined.

It is still further another object of the present invention to provide a molding of the type described including a curvilinear front surface which has an upper end that lies in the plane of the front surface of an upstanding panel to be joined to a horizontal base.

Another object of the present invention is to provide an elongate cove molding and method of installing a cove molding which has a vertical leg provided with an elongate, downwardly forwardly inclined upper end surface having a forward end which lies in the plane of the front surface of an upstanding panel.

Another object of the present invention is to provide a back splash molding including an upstanding leg having a front curvilinear surface and a top downwardly inclined surface joined at an edge which lies in the plane of the front surface of the back splash molding.

Another object of the present invention is to provide a horizontal non-laminated plastic solid surface counter top having an upwardly opening recess adjacent a rear edge thereof, a back splash having the lower front end portion provided with a downwardly and forwardly opening notch therein, and an elongate cove molding having a horizontal leg received by the upwardly opening recess and an upstanding leg received by the downwardly opening notch in the back splash.

It is yet another object of the present invention to provide a molding strip for sealing a solid surface counter top to any one of a plurality of different back splashes via adhesive placed therebetween to provide a tightly closed, virtually imperceptible joint therebetween.

It is another object of the present invention to provide a cove molding of the type received which has a vertical leg received in a downwardly forwardly opening notch provided in an upstanding panel to be joined to a horizontal base.

It is a further object of the present invention to provide a cove molding of the type described having a vertical leg received in a notch provided in the back splash and cooperating male and female members on the back splash and the vertical leg for precluding relative forward movement of the cove molding relative to the back splash.

With continued use and the settling of building materials, etc., it frequently occurs with the prior art counter tops and back splashes, that the moldings, back splashes and counter tops tend to move and separate relative to each other. It is a further object of the present invention to provide a new and novel cove molding of the type described which will interlock the counter top to the cove molding to prevent relative movement therebetween.

It is another object of the present invention to provide a method of installing a solid surface joinery molding which will lock a base, such as a counter top, to an upstanding panel, such as a back splash, to inhibit relative movement thereof.

It is another object of the present invention to provide a method of installing a cove molding which will lock the molding to a base and an upstanding panel to be joined thereto.

It is another object of the present invention to provide a method of installing a back splash molding in a downwardly opening notch provided in a back splash so that the upper front end of the vertical cove molding leg is flush with the front back splash surface.

It is another object of the present invention to provide a joinery method and apparatus for joining a solid surface base, such as a counter top to an upstanding panel mounted thereon, such as a back splash which is relatively thin.

Other objects and advantages of the present invention will become apparent to those of ordinary skill in the art as the description thereof proceeds.

SUMMARY OF THE INVENTION

An elongate one-piece joinery molding for joining a base, such as a counter top, to an upstanding panel, such as a back splash, and method of joining the base and panel via a one-piece back splash molding comprising a horizontal leg having a front face and a curvilinear top face joined to the front face along a forward upper edge, and a vertical leg, integral with the horizontal leg, having a front curvilinear face joined to the curvilinear top face to provide a smooth interface therebetween and a top end surface joined to the front curvilinear surface, the top end surface of the vertical leg being forwardly downwardly inclined.

DESCRIPTION OF THE DRAWINGS

The invention may be more readily understood by referring to the accompanying drawings, in which.

DESCRIPTION OF PREFERRED EMBODIMENT

Figure 1:
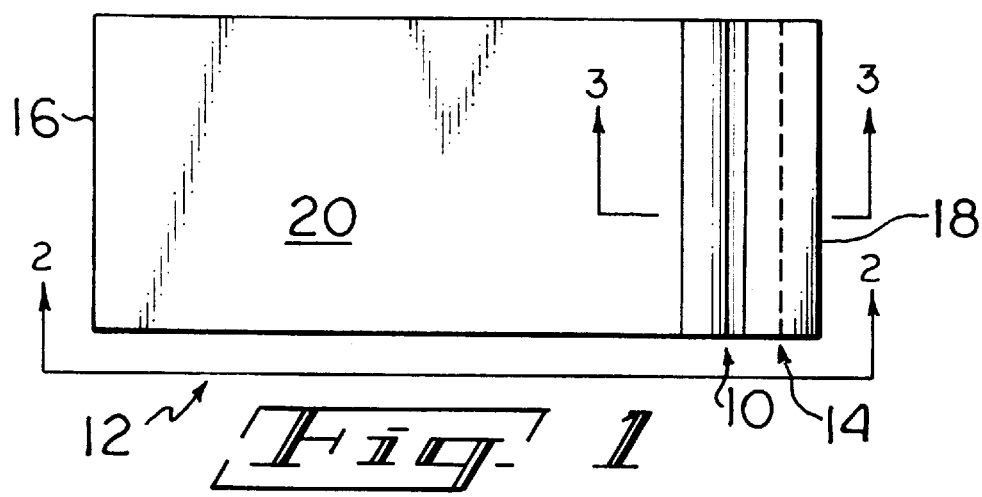
FIG. 1 is a top plan view of a counter top mounting a back splash and back splash molding constructed according to the present invention.
Figure 2:
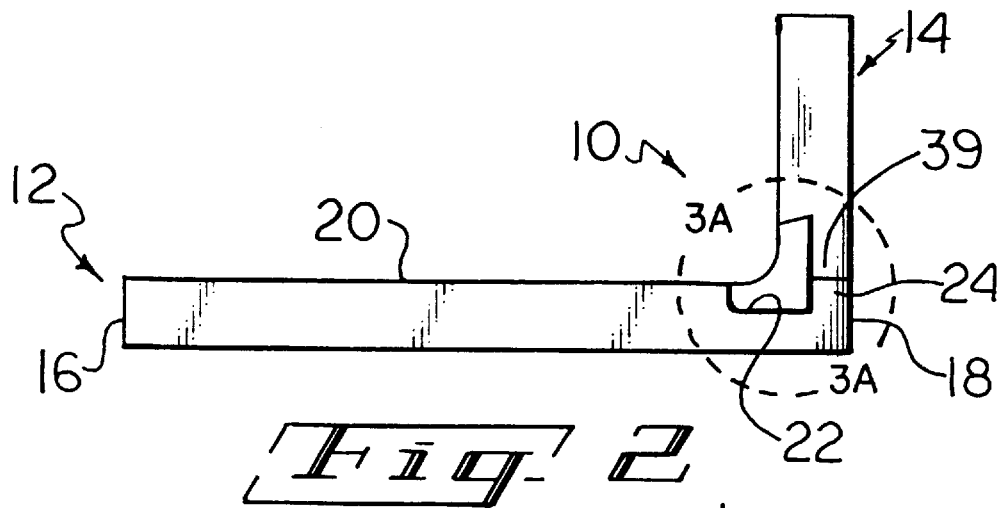
FIG. 2 is a front elevational view thereof, taken along the line 2—2 of FIG. 1.

A cove molding, generally designated 10, constructed according to the present invention, is particularly adapted for joining a base, such as a counter top slab, generally designated 12, and an upstanding panel, such as a back splash, generally designated 14, all of which preferably comprise non-laminated, non-foamed, non-coated, plastic solid surfacing material, commonly sold under the trademark CORIAN. The counter top 12 includes a front end 16, a rear end 18, and a top planar surface 20 lying in a horizontal plane 21. The top surface 20 includes a rear edge shoulder 24 which projects a distance 25 forwardly of the rear end 18, and an elongate, upwardly opening recess, slot or dado, generally designated 22, disposed forwardly adjacent the shoulder 24. The slot 22 includes a vertical front wall 26, a vertical rear wall 28, and a bottom planar wall 30, spanning the front wall 26 and the rear wall 28.

Figure 3:
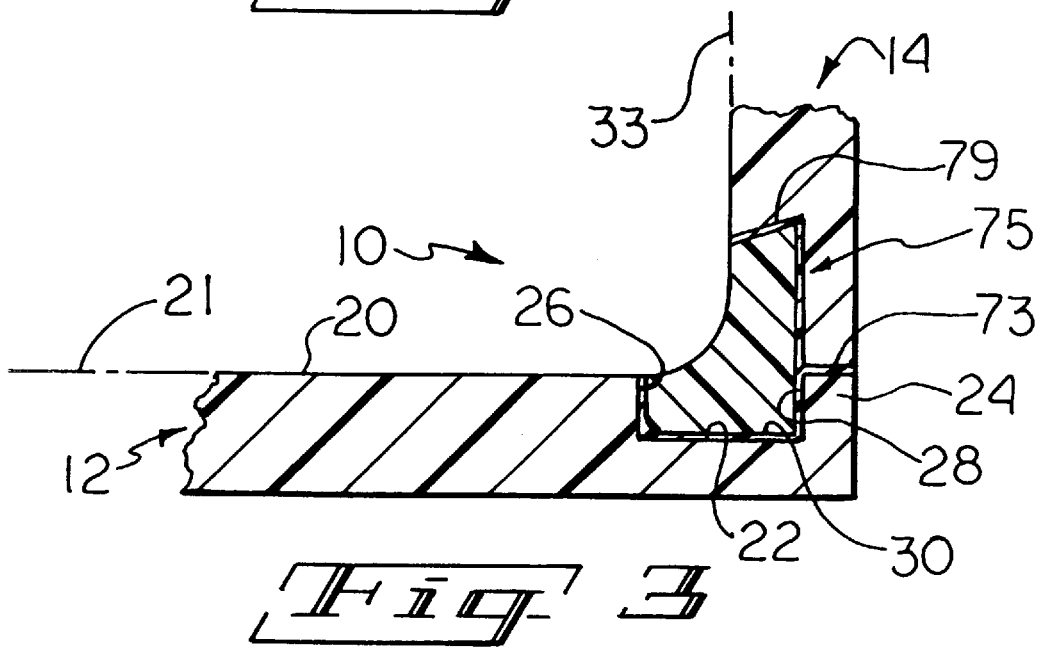
FIG. 3 is an enlarged, fragmentary sectional side view, taken along the section line 3—3 of FIG. 1.

The upstanding back splash 14 includes front and rear vertical faces 32 and 34, respectively, and a lower rear portion 39 having a bottom end wall or face 36 supported on the rear edge shoulder 24 of counter top 12. The front back splash face 32 lies in a vertical plane 33 (FIG. 3). The depth 38 of the rear back splash portion 39 is substantially equal to the depth 25 of the counter top shoulder 24.

Although the back splash faces 32, 34 are illustrated as being in substantially parallel planes, it should be understood that the vertical building wall (not shown) on which the back splash 14 is mounted may not be planar but may include slight forward and/or rearward undulations or variations therein. The back splash 14 is shaped to conform to the contour of the building wall against which it abuts. Also, the rear end 18 of the counter top will be cut to follow the contour of the building wall and thus may have some slight front to rear undulations therein. The slot rear wall 28 will uniformly remain a distance 25 forwardly of the counter top rear edge 18.

Figure 3A:
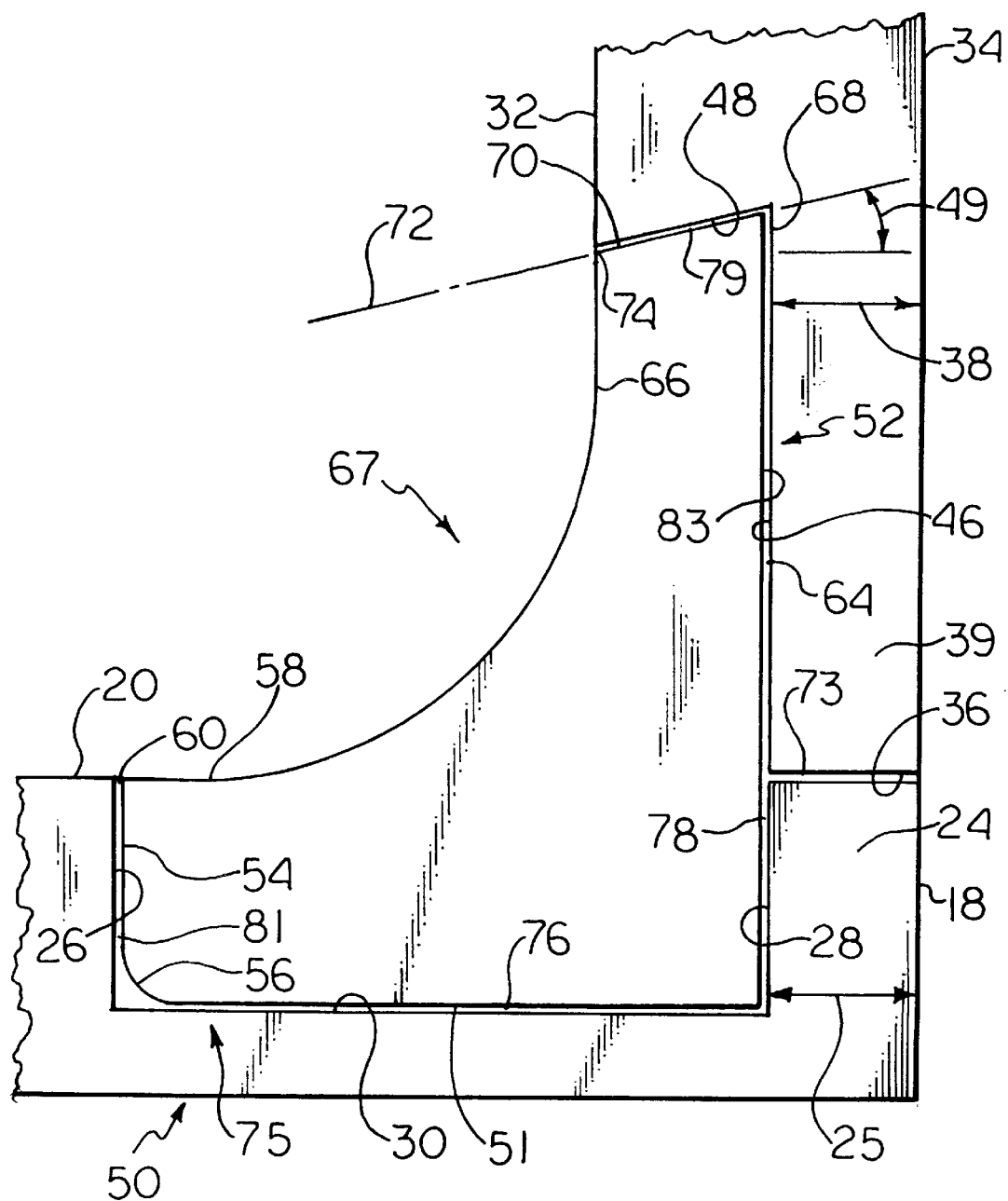
FIG. 3A is a greatly enlarged side elevational view encircled in the chain line circle 3A—3A of FIG. 2.
Figure 4:
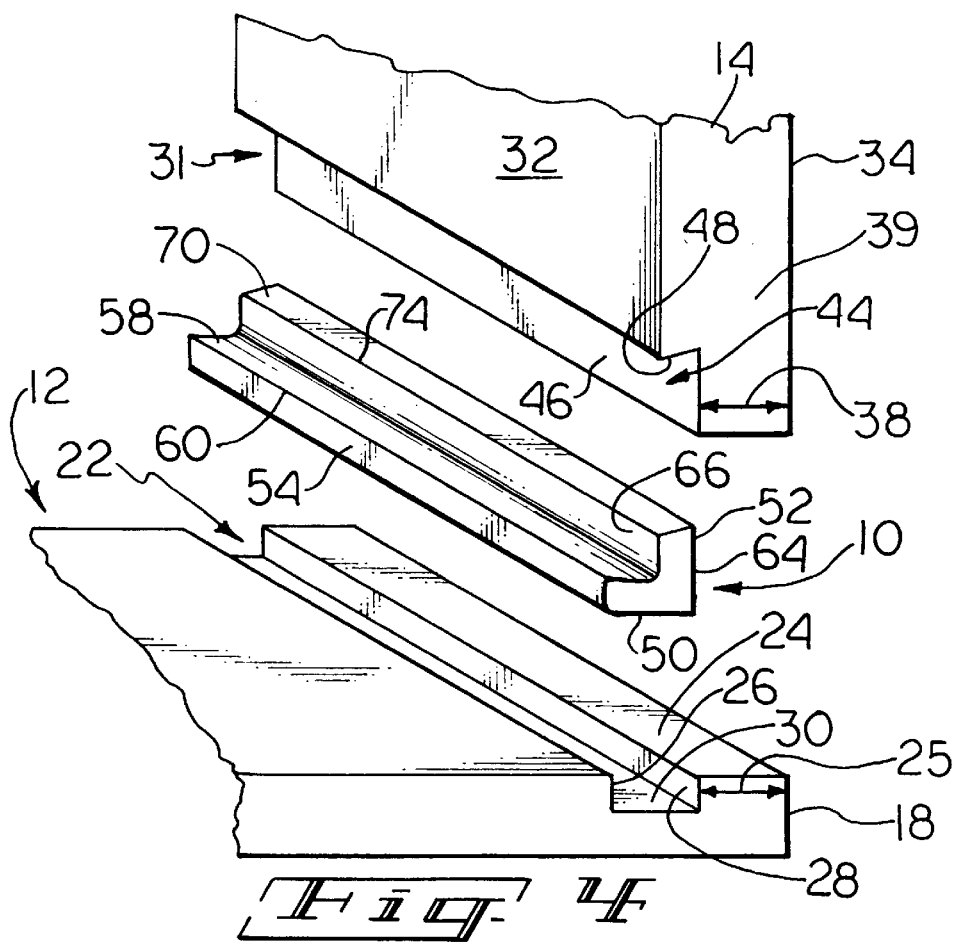
FIG. 4 is an enlarged, exploded view of the counter top, back splash and back splash molding prior to assembly.

A lower front portion 31 of the front back splash face 32 and the bottom back splash face 36 are conjointly cut away to provide a downwardly and forwardly opening notch, generally designated 44, having a back wall 46 and an upper end wall 48. As illustrated in FIG. 3, the plane 33 of the back splash front face 32 intersects the counter top slot 22 and lies between the front and rear counter top slot walls 26 and 28, respectively. The back splash notch upper end wall 48 is downwardly forwardly inclined at an angle 49 (FIG. 3A) of approximately 14° to the horizon to provide a stop for the cove molding as will to be described more particularly hereinafter.

The cove molding 10, which may be generally characterized as having an L-shape, is one-piece and includes an elongate horizontal leg, generally designated 50, and an elongate, integral vertical leg, generally designated 52. The horizontal cove molding leg 50 includes a generally planar bottom surface 51, spaced from but confronting the bottom slot surface or face 30, and an upstanding front surface 54 which confronts, but is slightly spaced from the front slot surface 26. The front cove mold surface 54 includes a lower curvilinear surface portion 56 which is joined to the bottom planar surface 52.

The horizontal leg 50 also includes a curvilinear top surface or face 58. The forward terminal end of top face 58 and the upper end of the front surface 54 intersect at a front upper edge 60 which lies in the plane 21 of the top counter surface 20 and is flush with the top surface 20.

The vertical leg 52 includes an upstanding planar back wall or face 64 and a curvilinear front wall or face 66 which has the same radius of curvature as the top front wall 58 and, as illustrated, forms a smooth curvilinear transition therewith to provide a curvilinear interface, generally designated 67, between the vertical and horizontal legs and defines a smooth curvilinear interface between the back splash 14 and the counter top 12.

The vertical cove molding leg 52 includes an upper elongate end 68 having a planar elongate top wall face 70 which lies in a plane 72 that is inclined downwardly forwardly at the same angle 49 as is the angle of inclination of the notch end wall 48. The planar face 70 is parallel to and slightly spaced from the notch end wall 48.

The front of the top face 70 and top of the front face 66 are joined at an upper forward edge 74 which lies in the plane 33 of front back splash face 32 and is flush with the front face of back splash face 32. The downwardly forwardly inclined upper end face 70 of the cove molding 10 cooperates with the female receptacle, provided at the upper end of notch 44, to provide interlocking surfaces which precludes or stops forward movement of the cove molding 10 relative to the back splash 22 and thus, rigidifies the structure.

An adhesive layer 73 is disposed between the shoulder 24 and the back splash bottom wall 36.

A layer of adhesive, generally designated 75, is provided any place a cove molding surface confronts a counter top surface or a back splash surface. More particularly, the adhesive layer 75 includes a layer 76 of suitable adhesive disposed between the confronting bottom wall surfaces 52 and 30, and a layer 78 between the lower part of the back face 64 and the back wall 28, respectively. The adhesive layer 75 also includes an adhesive layer 79 disposed between the confronting top surfaces 70 and 48, a layer 81 of adhesive disposed between the confronting front surfaces 54 and 26, and an adhesive layer 83 between the confronting surfaces 46 and 64.

Normally, a slight excess of adhesive is initially disposed between the confronting wall surfaces of the cove molding 10, the counter top 12 and the back splash 14 which will pass upwardly and outwardly between the confronting wall surfaces as the cove molding 10 is inserted into the slot 22 and the back splash 14 is mounted to seal the cove molding 10 to the counter top 12 and the back splash 14 and provide a water impervious joint which is virtually imperceptible.

It should be understood that although the invention mainly contemplates a joinery molding and method of joining a solid surface counter top to a back splash, that the invention will encompass joining a solid surface bases to another upstanding panel.

THE OPERATION AND METHOD

The counter top 12, which is formed of non-laminated, not coated, plastic solid surfacing material, is horizontally disposed on a suitable base (not shown) with the rear end 18 in abutting confronting relation with a building wall (not shown). The rear end 18 of the counter top 12 is cut to conform to the outline of the building wall against which it is to be abutted. The upper surface 20 of counter top 12 is cut along the rear vertical wall 24 a distance 25 forwardly of the rear counter top end 18 and thence cut along the front wall 22 and the bottom wall 30 to provide the upwardly opening, cove receiving slot 22.

The lower end of the front back splash face 32 is cut along the upwardly rearwardly inclined surface 48 and thence downwardly along the back wall 46 to provide the downwardly and forwardly opening notch 44. The cut providing the surface 49 is a distance 25 from the rear back splash face 34 to provide the rear back splash portion 39 which is equal in depth to the counter top shoulder 24.

The cove molding 10, which is formed in the shape illustrated in FIG. 3 is then coated with excess adhesive 75. Each of the bottom wall surface 51 and back surface 64 of the cove molding 10 is initially coated with an excess layer 76 of suitable adhesive and/or the rear walls 46 and 28 and bottom wall 30 are lined with an excess layer 76 of adhesive. Layers 79 and 81 of adhesive are disposed on the top cove molding face 70 of the vertical leg 68 and on the front 66, of the horizontal leg 50, respectively. The cove molding 10 is then mounted on the counter top 20 by inserting the horizontal leg 50 into the slot 22. The adhesive laden cove molding 10 is forced downwardly into the slot 22 to compress the adhesive layer 75 so that the adhesive 75 is forced upwardly and passes between all of the confronting surfaces of the cove molding and the confronting slot surfaces to completely fill the gap therebetween and seal the surfaces together.

An adhesive layer 79 is disposed on the elongate top cove molding face 70 and an adhesive layer 83 is disposed along the upper portion of the cove molding back face 64. The back splash 32 is then disposed in the position illustrated in FIG. 3 with the notch back wall 46 flush with the rear counter top slot wall 28 and the plane 33 of front back splash face 32 intersecting the slot 22 between the slot wall surfaces 26 and 28. A bead of adhesive 73 is disposed on the upper surface of the counter top shoulder 24 on which the rear back splash portion 39 rests.

Any excess adhesive is removed and/or ground down so that a smooth transition is present between the edges 60 and 70 and the adjoining counter top surface 20 and back splash surface 32 to provide a virtually imperceptible joint. As the adhesive dries, it provides a water pervious joint.

PRIOR ART

Figures 5, 6:
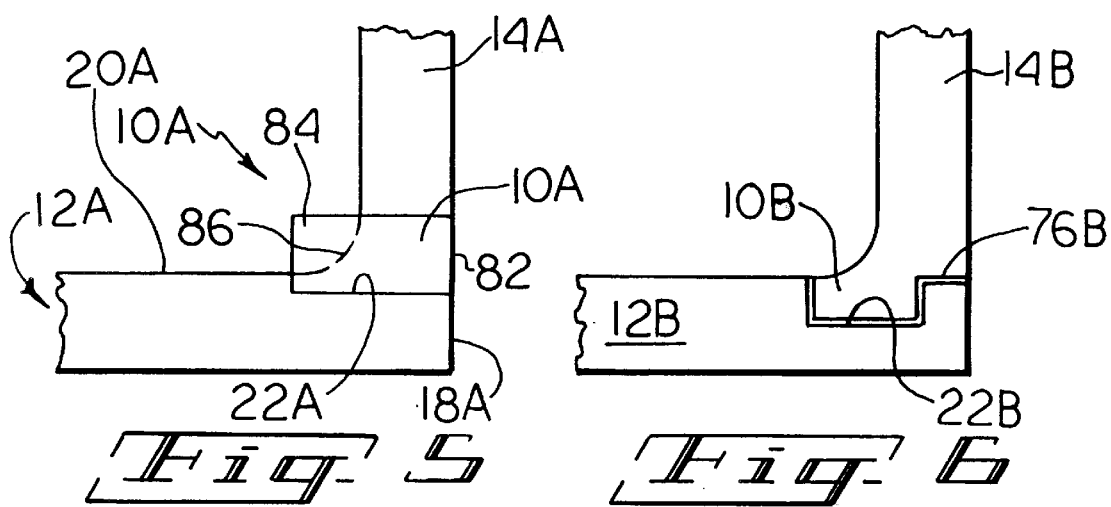
FIG. 5 is a side elevational view of a prior art construction.
FIG. 6 is a side elevational view of another prior art construction.

One prior art construction is illustrated in FIG. 5 wherein a counter top, generally designated 12A, has an elongate 22A cut into the rear upper edge portion thereof for receiving an elongate rectangular solid block of CORIAN material, generally designated 10A. The back 82 of the block 10A is flush with the counter top rear wall 18A. A back splash 14A rests on an upper surface 20A of the rectangular solid block 10A. A forward portion 84 of the block 12A is cut away with a router along a curvilinear path, illustrated in chain lines at 86, to provide a curvilinear surface. The abutting surfaces of the counter top 12A, block 10A and back splash 14A are glued with suitable adhesive. The embodiment illustrated in FIG. 5 is quite labor intensive and the routing of the front portion 84 of the block 10A requires precision so as not to mar the back splash 14A or counter top 12A.

This method is limited in that relatively thick back splashes must be utilized to provide sufficient exposed lower end surfaces for receiving sufficient adhesive. If relatively thin, i.e. ¼ inch, back splashes are utilized, bonding problems can result.

Another prior art construction, as illustrated in FIG. 6, is disclosed in the aforementioned U.S. Pat. No. 5,432,666, and includes a counter top 12B having a dado 22B cut therein for receiving a shoe 10B integrally coupled to the lower end of the back splash 14B. A layer of adhesive 76B is disposed therebetween as illustrated.

The back splash portions 14B are frequently cut into 12 foot lengths and the user may want only a short piece. Moreover, the user may not want to utilize the relatively expensive CORIAN back splash and may want to substitute a back splash of a different material which cannot be done with this prior art construction because the foot 10B is integral with the back splash 14B.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A joinery molding joining an upstanding panel, such as a back splash, having front and bottom faces provided with a downwardly and forwardly opening notch therein to a rear edge portion of a horizontal solid surface base, such as a counter top, having an upwardly opening elongate recess therein, said joinery molding comprising:
   a one-piece elongate cove molding including
      a horizontal leg forming an elongate base received in said upwardly opening recess of said base, and
      an upstanding leg, integral with said horizontal leg, including an upper elongate end received in said downwardly and forwardly opening notch of said panel.

2. The molding set forth in claim 1 wherein said upper end of said upstanding leg includes an upper elongate terminal end surface which is inclined downwardly forwardly for receipt in an upper end of said downwardly and forwardly opening notch.

3. The molding set forth in claim 2 including adhesive means for sealing said elongate cove molding to portions of said base adjacent said upwardly opening recess.

4. The molding set forth in claim 3 wherein said horizontal leg includes bottom and front surfaces joined by a lower front curvilinear interface therebetween.

5. The molding set forth in claim 4 wherein said upstanding leg includes a front surface having an upper terminal end adapted to be disposed flush with said front face of said panel.

6. The molding set forth in claim 5 wherein said horizontal leg has an upper surface having a forward edge adapted to be disposed flush with said horizontal solid surface base.

7. The molding set forth in claim 6 wherein said cove molding comprises non-laminated plastic solid surfacing material.

8. The molding set forth in claim 1 wherein said vertical leg includes means at the upper end thereof for inhibiting relative forward movement of said elongate cove molding relative to said panel.

9. The molding set forth in claim 1 wherein said cove molding includes an upper curvilinear interface between said vertical and horizontal legs to provide a curvilinear interface between said base and said panel.

10. The molding set forth in claim 9 wherein said upstanding leg includes a generally vertical planar back face and a front face having an upper terminal end adapted to be disposed flush with said front face of said panel; said horizontal leg having a generally planar bottom face, and a front face having an upper terminal end and an upper surface having a front terminal end joined to said upper terminal end of said front face to provide a forward upper edge adapted to be disposed flush with said counter top.

11. In combination with a horizontal base, such as a counter top, having front and rear edges and a solid upper surface;
   an upstanding panel, such as a back splash, having a front face and a lower end mounted adjacent said rear edge;
   said counter top having an elongate, upwardly opening recess in said solid upper surface adjacent said rear edge;
   said panel having a lower front end portion provided with a downwardly and forwardly opening notch therein; and
   an elongate cove molding having
      a horizontal leg received by said upwardly opening recess, and
      an upstanding leg received by said downwardly and forwardly opening notch in said panel.

12. The combination set forth in claim 11 wherein said upstanding leg includes an upper, elongate terminal end face which is downwardly forwardly inclined.

13. The combination set forth in claim 12 wherein said downwardly opening notch is upwardly rearwardly inclined complemental to said upper terminal end face of said upstanding leg.

14. The combination set forth in claim 11 wherein said front face on said panel lies in a plane; said upstanding leg including a front face having an upper terminal end in said plane.

15. The combination set forth in claim 11 wherein a portion of said panel adjacent said notch and said upper portion of said upstanding leg include complementally formed male and female means for precluding forward movement of said cove molding relative to said panel.

16. The combination set forth in claim 11 wherein said notch is cut into said front face of said panel and extends downwardly through a forward portion of said lower end of said panel;
   said notch including an upper end which is upwardly rearwardly inclined; said upstanding leg having an upper end surface which is downwardly forwardly inclined complementally to the inclination of said upper end of said notch.

17. The combination set in claim 13 wherein said upwardly opening recess comprises an elongate dado forwardly of said rear edge; said lower end of said panel having a rearward portion supported on said base rearward of said dado.

18. The combination set forth in claim 17 wherein said cove molding includes an upper curvilinear surface extending between said horizontal leg and said upstanding leg to define a smooth transitional interface between said front face of said panel and said base.

19. The combination set forth in claim 18 wherein said base, panel and cove molding each comprises non-laminated plastic solid surfacing material;
   said horizontal leg of said cove molding being shaped and sized relative to said dado to provide a gap therebetween; and a layer of adhesive disposed in said gap to seal said horizontal leg to said base and ensure a tightly closed, virtually imperceptible joint.

20. In combination:
   a solid surface, horizontally disposed base, such as a counter top having
      front and rear edge portions, and
      an elongate, upwardly opening slot provided in said base forwardly adjacent said rear edge portion;
   an upstanding panel having a front face and a lower end mounted on said rear edge portion rearwardly adjacent said upwardly opening slot;
   said lower end of said panel including a forwardly disposed, downwardly and forwardly opening notch; and an elongate, generally L-shaped, one-piece cove molding having
an elongate horizontally disposed leg received in said upwardly opening slot; and
an integral upstanding leg received by said downwardly and forwardly opening notch.

21. The combination set forth in claim 20 wherein said upstanding leg has an upper terminal end having a front edge flush with said front face of said panel.

22. The combination set forth in claim 21 wherein said horizontally disposed leg includes a forward terminal end having a forward top edge flush with said base.

23. The combination set forth in claim 20 wherein said base has an upper generally planar surface lying in a horizontal plane; said horizontal leg including
a front face; and
a curvilinear top face joined to said front face of said horizontal leg along a forward upper edge lying in said horizontal plane.

24. The combination set forth in claim 23 wherein said front face of said panel lies in a vertical plane, said vertical leg includes
a front curvilinear face having a smooth continuous interface with said curvilinear top face; and
a top end face joined to said front face along a second forward upper edge which substantially lies in said vertical plane.

25. The combination set forth in claim 24 wherein said base, said panel, and said cove molding comprise non-laminated plastic solid surfacing material.

26. The combination set forth in claim 20 wherein said slot in said base includes front and rear spaced apart upstanding walls; said front face of said panel lies in a plane disposed between said front and rear upstanding walls; said downwardly and forwardly opening notch including a rearward end wall in said panel disposed substantially flush with said rear upstanding wall of said notch.

27. A joinery molding joining an upstanding panel, such as a back splash, to a horizontally disposed solid surface base, such as a counter top, said panel including a front face and a bottom face having a rearward portion supported by a rear edge portion of said horizontally disposed solid surface base, said base provided with an upwardly opening elongate dado therein forwardly adjacent said rear edge portion, the lower end of said front face and the forward end of said bottom face of said panel having a downwardly and forwardly opening notch formed therein, said joinery molding comprising:
a one-piece elongate cove molding including
a horizontal leg having
a generally planar bottom surface, and
a curvilinear top surface having a forward end,
said horizontal leg being received in said dado with said forward end of said top surface being flush with said base;
a vertical leg, integral with said horizontal leg, having
a generally planar, vertical back surface,
a curvilinear front surface, forming a smooth transition with said top surface of said horizontal leg, having an upper terminal end, and
an upper surface spanning said back and front surfaces;
said vertical leg disposed in said downwardly and forwardly open notch with said upper terminal end of said front surface being flush with said front face of said panel.

28. The joinery molding set forth in claim 27 wherein said upper surface of said vertical leg includes an elongate upper face, having at least a portion which is downwardly forwardly inclined.

29. The joinery molding set forth in claim 28 wherein said solid surface base comprises non-laminated plastic solid surfacing material.

30. The joinery molding set forth in claim 29 wherein said elongate upper face of said vertical leg includes a forward terminal end joined to said upper terminal end of said front surface to provide an upper forward edge adapted to lie in the plane of said front face of said panel.

31. The joinery molding set forth in claim 30 wherein said elongate upper face of said vertical leg lies in a plane which is downwardly forwardly inclined.

32. The joinery molding set forth in claim 31 wherein said base includes an upper surface lying in a horizontal plane, said horizontal leg including an upstanding front surface having an upper terminal end joined to said forward end of said top surface to provide an upper forward edge adapted to lie in said horizontal plane.

33. An elongate molding strip sealed to a horizontal base, such as a counter top and to a vertical panel, such as a back splash, supported on a rear edge of said base; said base including a generally planar top surface having an upwardly opening dado therein forward of said rear edge, said dado including front and rear surfaces and a planar bottom surface spanning said front and rear surfaces; said vertical back splash including a front face, and a bottom face having a rearward edge supported by said rear edge of said base rearward of said dado, the lower end of said front face of said panel and the forward portion of said bottom face of said back panel being cut away to provide a downwardly and forwardly opening notch, said molding strip comprising:
a horizontal leg, received by said dado, having
a planar bottom surface for confronting said planar bottom surface of said dado,
a forward surface for confronting said front surface of said dado, and
an upper surface having a forward end disposed flush with said planar top surface of said base;
a vertical leg integral with said horizontal leg received by said downwardly and forwardly opening notch in said panel;
said vertical leg including
a planar back surface,
an upper terminal end surface, and
a front surface having an upper terminal end and a lower end forming a smooth transition with said upper surface of said horizontal leg; and
adhesive means for sealing said molding strip to said base and said panel to provide a water impermeable, joint therebetween.

34. The elongate molding strip set forth in claim 33 wherein said upper terminal end of said front surface is adapted to be disposed flush with said front face of said back splash.

35. The elongate molding strip set forth in claim 34 wherein said molding strip comprises non-laminated, plastic solid surface material; said upper terminal end surface being downwardly forwardly inclined.

36. In combination with a horizontal base, such as a counter top, of non-laminated plastic solid surfacing material having
a flat upper surface including said front and rear edges; and an upwardly opening dado formed in said upper surface forwardly of said rear edge, and a panel having
front and rear surfaces, and
a bottom edge having a
rearward portion supported by said rear edge of said base and
a forward portion;
said front surface of said panel and said forward portion of said bottom edge of said panel having a downwardly and forwardly opening notch formed therein;
a one-piece cove molding including
a horizontal leg received in said dado, and
an integral vertical leg received by said downwardly and forwardly opening notch in said panel.

37. The combination set forth in claim 36 including adhesive means disposed between said horizontal leg and portions of said counter top adjacent said dado and between said vertical leg and portions of said back splash adjacent said notch to provide a water impervious joint therebetween.

38. The combination set forth in claim 37 wherein said vertical leg includes an elongate upper end face and said horizontal leg includes an elongate front end face, and further including adhesive means disposed between said elongate upper end face and said panel and between said elongate front end face and said base to provide a water impervious imperceptible joint.

39. The combination set forth in claim 36 wherein said horizontal leg includes a top surface having a forward end disposed flush with said flat upper surface of said base.

40. The combination set forth in claim 36 wherein said vertical leg includes a front surface having an upper terminal end disposed flush with said front surface of said panel.

41. The combination set forth in claim 36 wherein said horizontal leg includes a top surface having a forward end disposed flush with said flat upper surface of said base.

42. The combination set forth in claim 41 wherein said front surface of said vertical leg and said top surface of said horizontal leg are joined in a smooth, curvilinear transition.

43. The combination set forth in claim 36 wherein said horizontal leg includes
a front surface, and
a curvilinear top surface joined to said front surface along a forward upper edge lying in the plane of said flat upper surface of said base.

44. The combination set forth in claim 43 wherein said vertical leg includes
a front curvilinear surface forming a smooth interface with said curvilinear top surface; and
a top end surface joined to said front curvilinear surface along an edge which lies in the plane of said front surface of said panel.

45. The combination set forth in claim 1 wherein said top end surface includes at least a portion which is downwardly forwardly inclined.

46. A method of joining a horizontal base, such as a counter top, having a top surface and front and rear edges, to an upstanding panel, such as a back splash, having a front and rear faces and a bottom end, with a cove molding which includes
a horizontal leg provided with a bottom surface, a front surface, and a curvilinear top surface, and
an integral vertical leg having an integral vertical leg having front and rear surfaces spanned by an upper terminal end surface,
said method comprising the steps of:
cutting an upwardly opening elongate recess in a rearward portion of said top surface of said base;
cutting a downwardly and forwardly opening elongate notch in a forward portion of said lower end of said upstanding panel;
inserting said horizontal leg of said molding into said upwardly opening recess; and
mounting a rearward portion of said upstanding panel on said base, rearwardly adjacent said upwardly opening recess, and concurrently disposing said vertical leg in said downwardly opening notch.

47. The method set forth in claim 46 including the step of adhesively sealing said horizontal leg to said base and said vertical leg to said upstanding panel to provide a water impervious joint.

48. The method set forth in claim 47 wherein the step of cutting an upwardly opening recess comprises cutting an upwardly slot, having front and back spaced apart vertical slot side walls, in said top surface of said base with said rear wall being disposed a predetermined distance forwardly of said rear edge of said base; said step of mounting said upstanding panel includes the step of disposing the plane of said front face of said upstanding panel between the front and rear vertical slot side walls.

49. A joinery molding joining a vertical panel, such as a back splash, to a horizontal solid surface base, such as a counter top, having an elongate slot in said solid surface, said panel having a front face provided with a frontal, downwardly and forwardly opening notch in the lower terminal end thereof
said joinery molding comprising:
a horizontally disposed leg received in said elongate slot in said base; and
an integral upstanding leg having an upper terminal end received in said downwardly and forwardly opening notch.

50. A method of installing a non-laminated, plastic, solid surface, generally L-shaped joinery molding which includes
a horizontal leg provided with a bottom surface, a front surface, and a curvilinear top surface and
an integral vertical leg having front and rear surfaces spanned by an upper terminal end surface,
at the junction of a non-laminated, plastic solid surface base, such as a counter-top, having a top surface and front and rear edges, and an upstanding panel, such as a back splash, having front and rear faces and a bottom end comprising the steps of:
cutting an upwardly opening elongate recess in a rearward portion of said top surface of said base;
cutting a downwardly and forwardly opening elongate notch in a forward portion of said lower end of said upstanding panel;
inserting said horizontal leg of said molding into said upwardly opening recess; and
mounting said upstanding panel on a rearward portion of said base, rearwardly adjacent said upwardly opening recess, and concurrently disposing said vertical leg in said downwardly opening notch.

51. The method set forth in claim 50 including the step of adhesively sealing said horizontal leg to said base and said vertical leg to said upstanding panel to provide a water impervious joint.

52. The method set forth in claim 51 wherein said step of cutting said recess includes the step of cutting an upwardly opening slot in said top surface a predetermined distance forwardly of said rear edge of said base.

53. The method set forth in claim 52 wherein said step of cutting said notch includes the step of cutting said front face of said upstanding along an upwardly rearwardly inclined plane to provide an upwardly inclined top wall of said notch.

54. The method set forth in claim 53 wherein said step of cutting said notch comprises the step of providing a vertical cut in said bottom end of said back splash a distance forwardly of said back face of said upstanding panel equal to said predetermined distance, and a distance upwardly sufficient to intersect said upwardly rearwardly inclined plane.

55. The method set forth in claim 50 wherein said step of mounting said upstanding panel includes the step of disposing the upper end of said front surface of said vertical leg flush with said front face of said upstanding panel.

56. The method set forth in claim 50 wherein said step of mounting said upstanding panel includes the step of disposing the upper end of said front surface in the plane of said front face of said upstanding panel.

57. The method set forth in claim 50 wherein said step of mounting said upstanding panel includes the step of disposing the intersecting edge of said front and terminal end surfaces of said vertical leg in the plane of said front face of said upstanding panel.

58. The method set forth in claim 57 wherein the step of cutting an upwardly opening recess comprises cutting an upwardly slot, having front and back spaced apart vertical slot side walls, in said top surface of said base with said rear wall being disposed a predetermined distance forwardly of said rear edge of said base; said step of mounting said upstanding panel includes the step of disposing the plane of said front face of said upstanding panel between the front and rear vertical slot side walls.

59. The method set forth in claim 58 wherein said step of mounting said horizontal leg includes the step of disposing the upper end of said front face of said horizontal leg in the plane of said top surface of said base.

\* \* \* \* \*